(12) United States Patent
Granone et al.

(10) Patent No.: US 10,353,064 B2
(45) Date of Patent: Jul. 16, 2019

(54) METHOD AND APPARATUS FOR DETECTING AIRBORNE OBJECTS

(71) Applicants: DECISIVE ANALYTICS CORPORATION, Huntsville, AL (US); EIKON RESEARCH, INC., Huntsville, AL (US)

(72) Inventors: Jess Granone, Decatur, AL (US); James Kirkland, Huntsville, AL (US); Robert DeSilva, Huntsville, AL (US)

(73) Assignee: Decisive Analytics Corporation, Arlington, VA (US)

( * ) Notice: Subject to any disclaimer, the term of this patent is extended or adjusted under 35 U.S.C. 154(b) by 328 days.

(21) Appl. No.: 15/228,315

(22) Filed: Aug. 4, 2016

(65) Prior Publication Data

US 2017/0343664 A1    Nov. 30, 2017

Related U.S. Application Data

(60) Provisional application No. 62/341,679, filed on May 26, 2016.

(51) Int. Cl.
*F41G 7/00* (2006.01)
*F41G 7/22* (2006.01)
(Continued)

(52) U.S. Cl.
CPC .............. *G01S 13/86* (2013.01); *F41G 7/008* (2013.01); *F41G 7/224* (2013.01); *F41G 7/226* (2013.01);
(Continued)

(58) Field of Classification Search
CPC ...... G01S 13/86; G01S 13/865; G01S 13/867; G01S 13/883; F41G 7/008; F41G 7/224; F41G 7/2246; F41G 7/2253; F41G 7/226; F41G 7/2286; F41G 7/2293; F41H 11/02; H01Q 1/08; H01Q 1/081; H01Q 1/082; H01Q 1/084; H01Q 1/085; H01Q 1/087; H01Q 1/088; H01Q 1/10
See application file for complete search history.

(56) References Cited

U.S. PATENT DOCUMENTS 3,114,149 A    12/1963  Jessen, Jr.
3,503,072 A     3/1970  Thompson
(Continued)

FOREIGN PATENT DOCUMENTS

EP    0 286 716    10/1988

OTHER PUBLICATIONS

Rottenberg M.M., "Fin Assembly," US Statutory Invention Registration No. H905, Published Apr. 2, 1991.
(Continued)

*Primary Examiner* — Peter M Bythrow
(74) *Attorney, Agent, or Firm* — Emerson Thomson Bennett, LLC; Daniel A. Thomson

(57) ABSTRACT

Provided is an apparatus for detecting airborne objects comprising a kill vehicle bus having a radar sensor. The radar sensor may be an interferometric sensor comprising a plurality of transmit-receive arrays. Each of the transmit-receive arrays may be adapted to be stowed in a stowed position in or on the kill vehicle bus, and may be adapted to be expandable from the stowed position to an operable position.

19 Claims, 5 Drawing Sheets

(51) Int. Cl.
*F41H 11/02* (2006.01)
*G01S 13/00* (2006.01)
*G01S 13/02* (2006.01)
*G01S 13/86* (2006.01)
*G01S 13/88* (2006.01)

(52) U.S. Cl.
CPC ......... *F41G 7/2246* (2013.01); *F41G 7/2253* (2013.01); *F41G 7/2286* (2013.01); *F41G 7/2293* (2013.01); *F41H 11/02* (2013.01); *G01S 13/003* (2013.01); *G01S 13/883* (2013.01); *G01S 2013/0254* (2013.01)

(56) References Cited

U.S. PATENT DOCUMENTS

| | | | | |
|---|---|---|---|---|
| 3,898,668 | A * | 8/1975 | Evans | F41G 7/2213 342/424 |
| 3,908,933 | A * | 9/1975 | Goss | F02C 7/22 244/3.21 |
| 4,085,910 | A * | 4/1978 | Baker | F41G 7/008 244/3.16 |
| 4,108,400 | A * | 8/1978 | Groutage | F41G 7/008 244/3.15 |
| 4,264,907 | A * | 4/1981 | Durand, Jr. | F41G 7/008 342/53 |
| 4,348,677 | A * | 9/1982 | Salmond | H01Q 1/281 343/729 |
| 4,380,013 | A * | 4/1983 | Slysh | H01Q 1/288 343/753 |
| 4,383,663 | A | 5/1983 | Nichols | |
| 4,477,814 | A * | 10/1984 | Brumbaugh | H01Q 21/20 342/53 |
| 4,540,139 | A * | 9/1985 | Levy | F41G 7/2253 244/3.19 |
| 4,540,140 | A * | 9/1985 | Levy | F41G 7/2253 244/3.19 |
| 4,698,638 | A * | 10/1987 | Branigan | F41G 7/008 342/53 |
| 4,751,511 | A | 6/1988 | Komata et al. | |
| 4,796,834 | A * | 1/1989 | Ahlstrom | F41G 7/2246 244/3.1 |
| 4,944,226 | A | 7/1990 | Wedertz et al. | |
| 5,170,171 | A | 12/1992 | Brown | |
| 5,182,564 | A * | 1/1993 | Burkett | F41G 7/008 342/53 |
| 5,196,857 | A * | 3/1993 | Chiappetta | B64G 1/22 244/159.5 |
| 5,268,680 | A * | 12/1993 | Zantos | F41G 7/008 342/53 |
| 5,307,077 | A * | 4/1994 | Branigan | G01S 13/4463 342/53 |
| 5,458,041 | A | 10/1995 | Sun et al. | |
| 5,504,488 | A | 4/1996 | Henderson et al. | |
| 5,898,529 | A * | 4/1999 | Meyer | G02B 23/00 343/781 P |
| 5,973,649 | A * | 10/1999 | Andressen | H01Q 15/22 343/708 |
| 5,988,071 | A | 11/1999 | Taylor | |
| 6,114,984 | A | 9/2000 | McNiff | |
| 6,150,974 | A | 11/2000 | Tasaka et al. | |
| 6,262,800 | B1 * | 7/2001 | Minor | F41G 7/008 244/3.13 |
| 6,268,822 | B1 * | 7/2001 | Sanders | F41G 7/008 342/175 |
| 6,606,066 | B1 * | 8/2003 | Fawcett | F41G 7/008 343/725 |
| 6,741,341 | B2 * | 5/2004 | DeFlumere | F41G 7/008 250/203.6 |
| 6,806,823 | B1 | 10/2004 | Smith et al. | |
| 6,860,448 | B2 | 3/2005 | Rastegar | |
| 6,877,691 | B2 | 4/2005 | DeFlumere et al. | |
| 7,109,935 | B2 | 9/2006 | Saint Clair et al. | |
| 7,183,966 | B1 * | 2/2007 | Schramek | G01S 17/87 244/3.1 |
| 7,350,744 | B1 | 4/2008 | Schwartz et al. | |
| 7,494,089 | B2 * | 2/2009 | Williams | F41G 3/04 102/473 |
| 7,494,090 | B2 * | 2/2009 | Leal | F41G 3/04 102/473 |
| 7,714,797 | B2 * | 5/2010 | Couchman | B64G 1/66 244/172.6 |
| 7,741,991 | B1 * | 6/2010 | MacBean | F41G 7/2213 342/141 |
| 7,755,533 | B2 | 7/2010 | Harris et al. | |
| 7,786,418 | B2 * | 8/2010 | Taylor | F41G 7/008 244/3.1 |
| 7,860,344 | B1 | 12/2010 | Fitzpatrick et al. | |
| 7,977,614 | B2 | 7/2011 | Raviv | |
| 8,058,595 | B2 * | 11/2011 | Koehler | B64C 1/36 244/121 |
| 8,084,724 | B1 * | 12/2011 | Brosch | F41G 7/008 244/158.1 |
| 8,084,726 | B2 * | 12/2011 | Hanlon | F42B 10/663 244/3.1 |
| 8,330,646 | B2 * | 12/2012 | Baumatz | G01S 7/48 342/52 |
| 8,378,880 | B1 * | 2/2013 | Boka | G01S 13/726 244/3.1 |
| 8,387,536 | B2 | 3/2013 | Sar et al. | |
| 8,698,058 | B1 * | 4/2014 | LaPat | F41G 7/008 244/3.1 |
| 8,829,404 | B1 * | 9/2014 | Rinker | F41G 7/008 250/203.1 |
| 8,988,272 | B2 | 3/2015 | Chernukhin | |
| 9,128,184 | B1 | 9/2015 | Bachmann et al. | |
| 2002/0059881 | A1 * | 5/2002 | Steiner | F42B 15/01 102/293 |
| 2004/0021852 | A1 * | 2/2004 | DeFlumere | F41G 7/008 356/141.1 |
| 2005/0000383 | A1 * | 1/2005 | Facciano | F42B 10/46 102/377 |
| 2009/0314890 | A1 * | 12/2009 | Koehler | B64C 1/36 244/119 |
| 2010/0052975 | A1 * | 3/2010 | Milano | F41G 7/2246 342/175 |
| 2010/0127113 | A1 * | 5/2010 | Taylor | F41G 7/008 244/3.16 |
| 2010/0213306 | A1 * | 8/2010 | Olden | F42B 10/50 244/3.15 |
| 2010/0253567 | A1 * | 10/2010 | Factor | G01S 7/36 342/52 |
| 2011/0127328 | A1 * | 6/2011 | Warren | F41G 5/08 235/412 |
| 2012/0139786 | A1 * | 6/2012 | Puzella | G01S 7/032 342/368 |
| 2012/0169524 | A1 * | 7/2012 | Yeary | G01S 5/0273 342/62 |
| 2013/0214093 | A1 * | 8/2013 | White | B64C 7/00 244/121 |
| 2016/0047628 | A1 * | 2/2016 | Kolanek | F41G 7/007 701/7 |
| 2016/0048129 | A1 * | 2/2016 | Kolanek | F41H 11/02 701/2 |
| 2016/0245907 | A1 * | 8/2016 | Parker | F41H 11/02 |

OTHER PUBLICATIONS

Gulick J.F., Miller J.S., "Missile Guidance: Interferometer Homing using Body-Fixed Antennas," Johns Hopkins University, Applied Physics Laboratory, Aug. 1982.
Parsch A., "AIM-54," Directory of US Military Rockets and Missiles, www.designation-systems.net/dusrm/m-54.html, Oct. 2004.
Elko, E.C., Howard, J.W., Kochanski, R.C., Nguyen, T.T., Sanders, W.M., "Rolling Airframe Missile: Development, Test, Evaluation, and Integration," Johns Hopkins APL Technical Digest, vol. 22, pp. 573-582, No. 4, 2001.

(56) References Cited

OTHER PUBLICATIONS

European Space Agency, "Sentinel-1 Unfolds its Large Solar Wings and Radar Antenna," Astronomy & Space/Space Exploration, Feb. 24, 2014, phys.org/print312453784.html.

* cited by examiner

METHOD AND APPARATUS FOR DETECTING AIRBORNE OBJECTS

This application claims priority to U.S. Provisional Patent Application No. 62/341,679, filed May 26, 2016, which is incorporated herein by reference. The present subject matter is directed to defending against a ballistic missile threat. More specifically the present subject matter is directed to a Ballistic Missile Defense System ("BMDS"). More specifically, the present subject matter is directed to a BMDS with an interferometric sensor having an expandable transmit-receive array.

I. BACKGROUND

There are multiple technical challenges present in current BMDS systems. These challenges include, but are not necessarily limited to, target discrimination, target-object mapping, and tracking accuracy.

Target discrimination, can be difficult in a complex threat environment using only the ground or surface-based sensor. Depending on the bandwidth of the surface-based sensor, it is highly likely that multiple objects will occupy the same range gate. In situations where multiple objects occupy the same range gate, they cannot be resolved in range. Further, the objects usually cannot be resolved in angle because of the distance to the target. The reliability of the target discrimination process could be improved when coupled with IR measurements from a seeker (or kill vehicle bus), but this introduces additional challenges and leads to the second technical challenge.

The second technical challenge is target-object mapping. Generation of the target-object map ("TOM") is complicated because measurements reported by the surface-based sensor and a kill vehicle bus's onboard sensor may vary dramatically due to the difference in target signature in the different bands. Correlating measurements from IR and RF sensors is further complicated by the fact that the sensors are not co-located. In this case, a kill vehicle bus must correlate a 2-D IR representation of the threat complex with a 3-D RF representation from surface-based sensors. Given the extreme difference in aspects to the threat complex, this is very challenging.

The third technical challenge is tracking accuracy. The surface-based radar has limited angular accuracy due to the extreme range to the target. The limited angle resolution leads to range gates encompassing large volumes of space: nearby objects and high-density volume clutter are very likely to occupy the same range gate as the object of interest. Depending on the surrounding material in the threat complex, the target's signal-to-clutter ratio ("S/C") can be degraded significantly, leading to a lower quality track. The situation can be improved marginally by integrating the kill vehicle bus's IR measurements; however, because the kill vehicle bus cannot produce its own range measurements, and because the sensors are not co-located, it can be difficult to measure the target's complete state. Adding to this problem, it is difficult to register the two sensors, that is, produce measurements in the same reference frame, because of the significant separation of the two sensors and the kill vehicle bus's extreme velocity.

Sensors of different phenomenologies may be utilized within a BMDS. Correlation of sensor observations remains a challenge. It remains desirable to provide technology for multiple phenomenologies to be present on interceptors of a BMDS adapted to prevent, minimize, reduce, or alleviate some of the sensor to sensor correlation challenges and enhance interceptor on-board tracking, discrimination, and target-object mapping capability.

II. SUMMARY

In accordance with one aspect of the present subject matter provided is an apparatus for detecting airborne objects comprising a kill vehicle bus having a radar sensor. The radar sensor may be an interferometric sensor comprising a plurality of transmit-receive arrays. Each of the transmit-receive arrays may be adapted to be stowed in a stowed position in or on the kill vehicle bus, and may be adapted to be expandable from the stowed position to an operable position.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
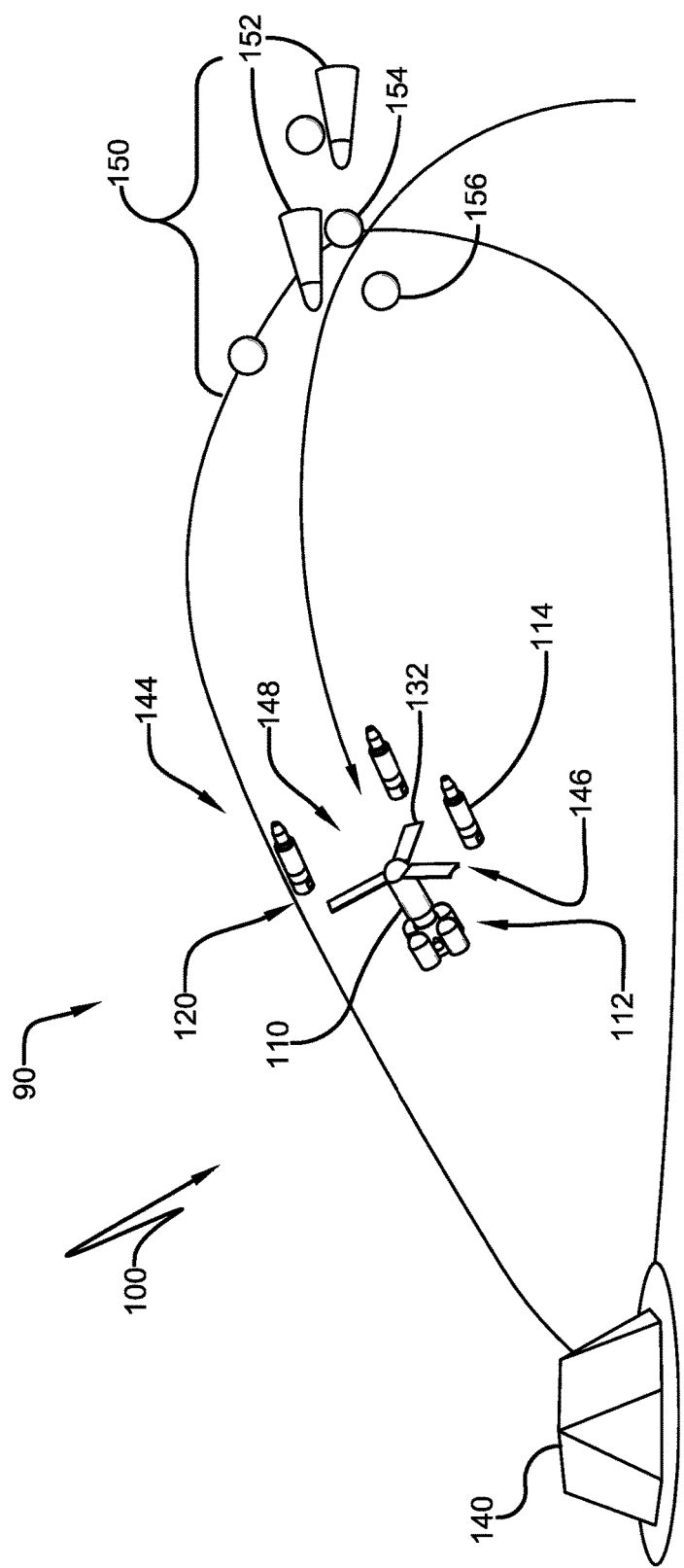
FIG. 1 is a diagram of an apparatus for detecting airborne objects according to one embodiment of the present subject matter.

Referring now to the drawings wherein the showings are for purposes of illustrating embodiments of the invention only and not for purposes of limiting the same, and wherein like reference numerals are understood to refer to like components, provided is a dual-mode dual-band RF and IR system that may prevent, minimize, reduce, or alleviate some or all of the technical problems faced by current BMDS 90, and may provide improved hit-to-kill capability in ballistic missile engagements. The proposed system comprises a kill vehicle bus 110 sensor suite that includes a dual-band radar and a passive IR sensor. The dual-band radar may comprise one band that is receive-only, and a second band that is adapted to both transmit and receive. The passive IR sensor may comprise a multi-color IR sensor. A multi-color IR sensor may be a two-color IR sensor, a three-color IR sensor, a five-color IR sensor, or an IR sensor for a number of colors chosen with good engineering judgment. The kill vehicle bus 110 may be adapted to fuse data collected by the dual-band RF and multi-color IR sensors, enabling high-confidence correlation and discrimination of objects in the field of view ("FOV") of the kill vehicle bus 110.

The first sensor in the sensor suite may be a semi-active radar operating in the same band as a surface-based radar. In the semi-active mode, the kill vehicle bus 110 will use the back-scatter from the surface-based radar to locate the threat complex. This may greatly improve the detection range of the kill vehicle bus 110, because of the surface-based radar's significant transmitted power and the decreased range of the kill vehicle bus 110 to the threat complex. Because of the high power and decreased range, the semi-active radar can operate with antennas significantly smaller than the surface-based radar and still achieve high signal-to-noise during detection. In some embodiments, the semi-active radar may be an X band receiver adapted to receive the illumination of a threat complex by surface-based radar.

The second sensor in the sensor suite may be a high-bandwidth active-mode radar operating in the Ka or W band. The semi-active and active-mode radars may be implemented as Active Electronically-Scanned Array ("AESA") interferometer radars. Interferometers are adapted to form a beam on receive after digitizing the RF data and may provide greater than 6 times the tracking accuracy as the same configuration implemented as a monopulse system. Operating the interferometer at the Ka or W band permits the interferometer's high angle resolution to be combined with significant instantaneous bandwidth. This combination may yield very high range and angle resolution that is capable of separating the target returns from the clutter returns. This capability supports improved discrimination and improved track accuracy during the intercept. In some embodiments, the active radar will be either a Ka band or W band radar that will transmit and receive. In some embodiments the active radar may be a distinct radar device from that of the semi-active radar. In some embodiments, the active radar may comprise a transmitter, adapted to transmit in either the Ka band or W band, and a receiver adapted to receive X band as well as either Ka band or W band.

The final sensor is the passive multi-color IR sensor. As used herein, unless otherwise noted, color refers to wavelength. The IR sensor may have the ability to receive two different wavelengths simultaneously. The kill vehicle bus 110 may be adapted to fuse measurements produced by the IR sensor with measurements made with the active-mode radar. This can improve the angle track of the of the kill vehicle bus 110 and significantly improve discrimination of the target. The fused RF and IR measurements can be used to guide the kill vehicle bus 110 toward a threat's intercept point.

Provided is a multi-stage approach to Ballistic Missile Defense ("BMD") engagement. The BMD engagement may be executed in several stages, from acquisition by a surface-based radar 140 to the kill vehicle bus 110 intercept, with different sensors supporting each stage. The engagement can be partitioned into three stages. These three stages are initial threat acquisition, kill vehicle bus 110 threat acquisition and handover, and kill vehicle bus 110 discrimination and intercept.

During the initial threat acquisition stage, the threat complex 150 is acquired by the surface-based radar 140. The surface-based radar 140 may be cued to the approximate location of the threat complex 150. The threat complex 150 may comprise one or more targets 152, as well as debris 154 or counter-measures 156 or both. The surface-based radar 140 searches and acquires the target 152 as well as any debris 154 or counter-measures 156. The kill vehicle bus 110 is launched, an uplink is established, and surface-based radar measurements 160 from the surface-based radar 140 are communicated to the kill vehicle bus 110 for use in the acquisition of the threat complex 150 by the kill vehicle bus 110.

During the kill vehicle bus 110 threat acquisition and handover stage, the kill vehicle bus 110 will acquire the threat complex 150 using its passive semi-active radar 144. The semi-active radar 144 will operate at the same frequency as the surface-based radar 140. Using initial threat complex estimates from the surface-based radar 140, the kill vehicle bus 110 will acquire the threat complex 150 using semi-active radar measurements 164 from the semi-active radar 144. Because the kill vehicle bus 110 is significantly closer to the target 152, the kill vehicle bus 110 will be capable of detection at great ranges using the backscattered energy from the surface-based radar 140. The kill vehicle bus 110 will track the threat complex 150 until the threat complex 150 is within the detection range of the active-mode radar 146 of the kill vehicle bus 110. After this point, the kill vehicle bus 110 will use its semi-active mode radar 144 to steer the active-mode radar 146 to the threat complex. The active mode radar 146 may be used to generate active-mode radar measurement 166. The kill vehicle bus 110 will fuse the semi-active track measurements 164 with the active-mode radar measurements 166, as it begins its end-game maneuver.

During the kill vehicle bus 110 discrimination and intercept stage, the kill vehicle bus 110 turns its multi-color IR sensor 148 to the threat complex 150 being tracked by the active-mode radar 146. The multi-color IR sensor 148 may be co-located with the active RF sensor of the active-mode radar 146 in order to minimize, reduce, or eliminate the traditional RF to IR Target Object Map challenge facing conventional BMDS as described above. As with the RF sensors, the proximity of the kill vehicle bus 110 to the threat complex 150 may yield a high signal to noise ratio ("SNR"), enhancing feature extraction or other discrimination techniques of the entire threat complex 150. As the kill vehicle bus 110 accomplishes discrimination of the entire threat complex 150, it will direct the kill vehicle bus 110 into the most threatening target 152. If more than one threatening target 152 is identified in the threat complex 150, the kill vehicle bus 110 will communicate the additional targets 152 back to the BMDS 90 for later engagement, and will engage the target 152 based on the highest threat and probability of intercept for that engagement of the kill vehicle bus 110.

Figure 2:
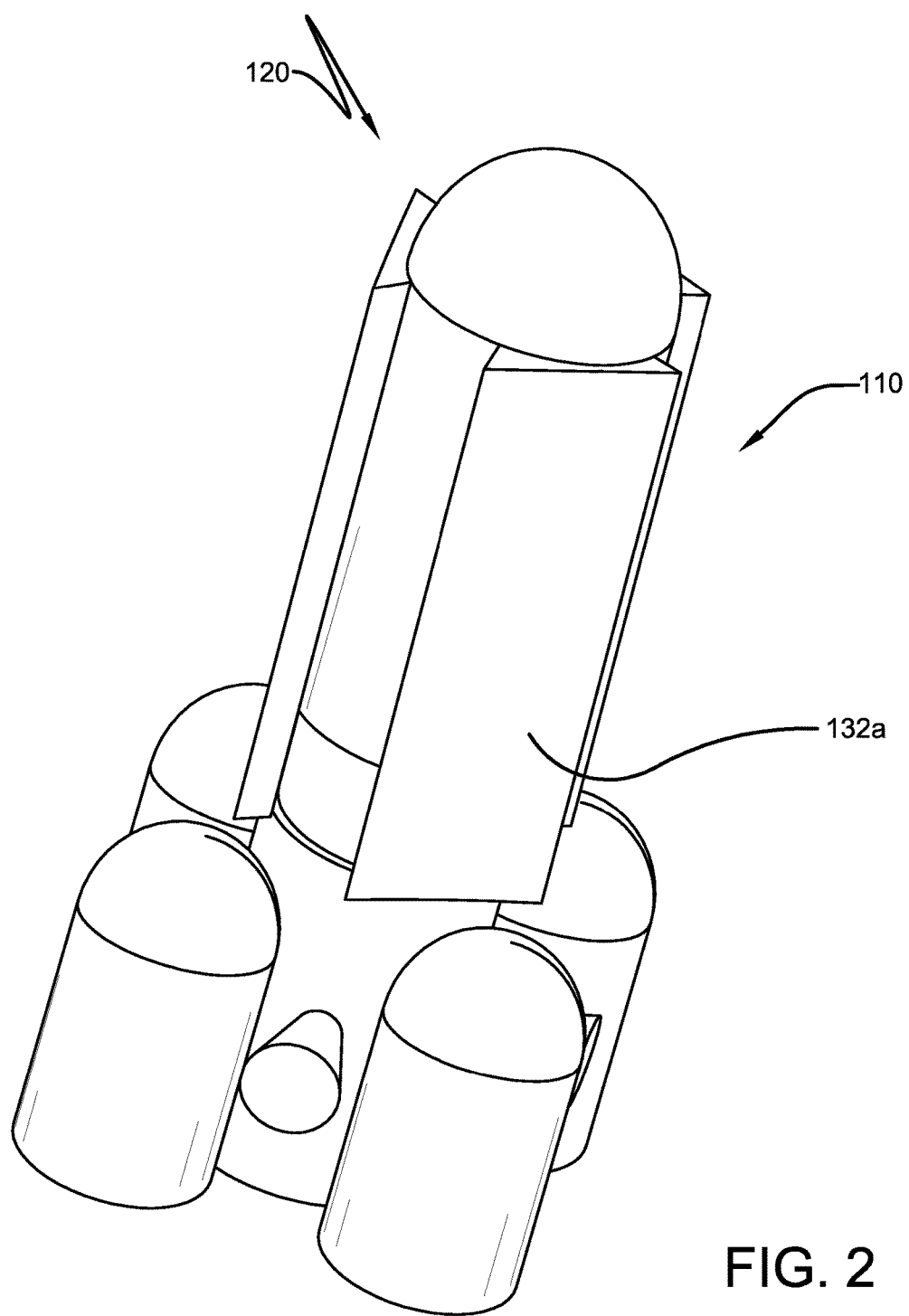
FIG. 2 is a model of a kill vehicle bus having a plurality of transmit-receive arrays in a stowed position according to one embodiment of the present subject matter.
Figure 3:
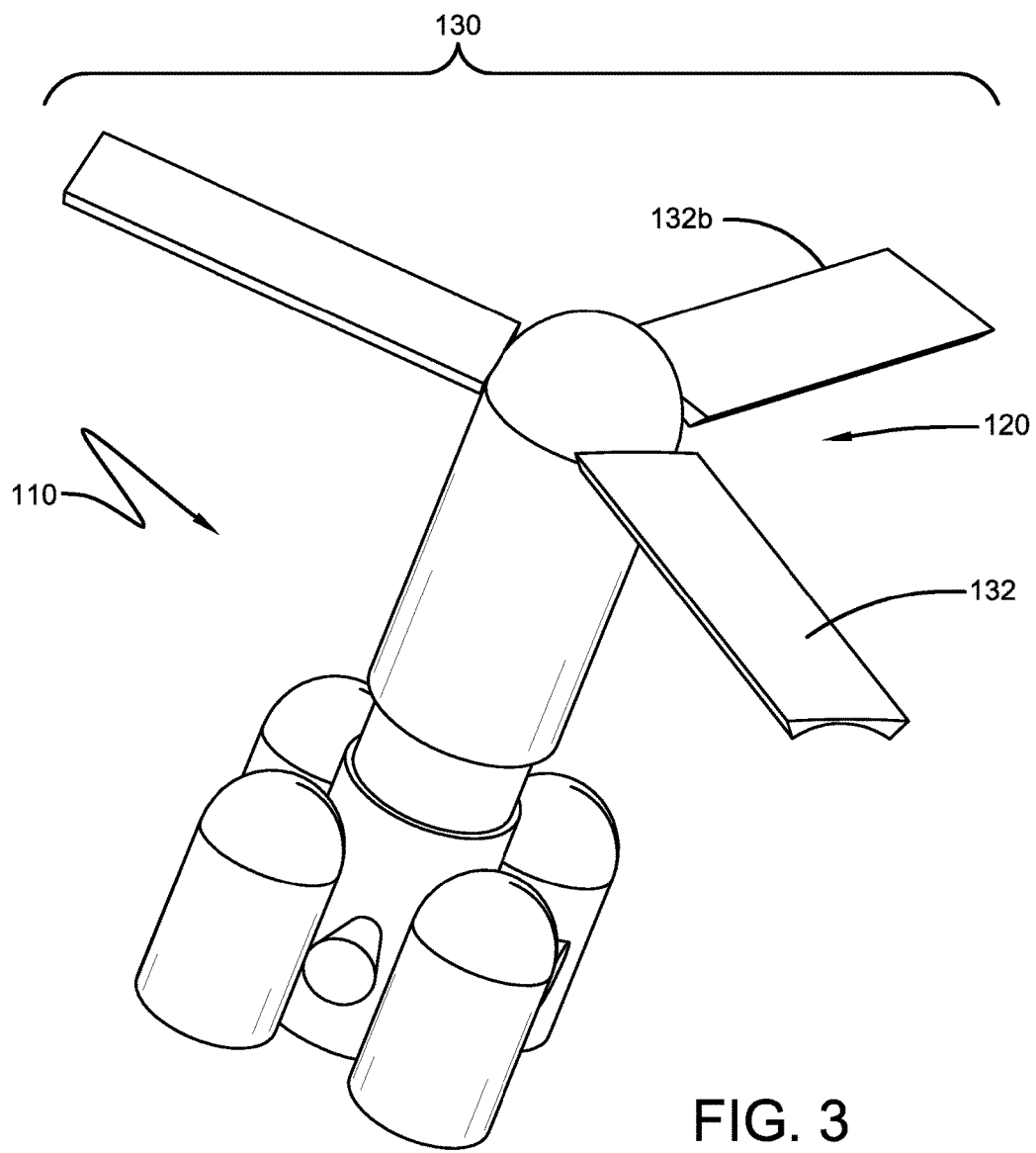
FIG. 3 is a model of a kill vehicle bus having a plurality of transmit-receive arrays in an operable position according to one embodiment of the present subject matter.
Figure 4:
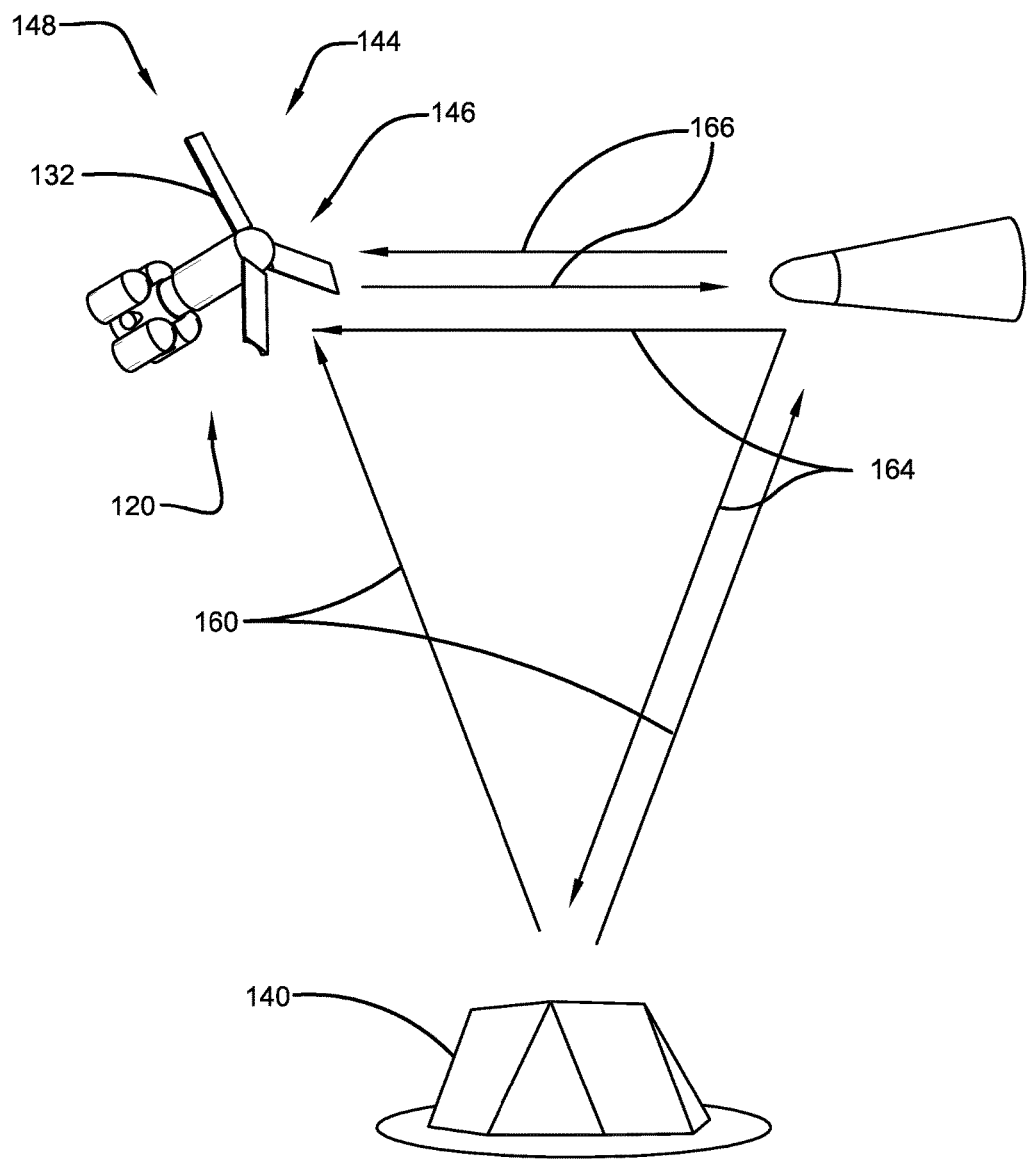
FIG. 4 is a diagram of an apparatus for detecting airborne objects in operation according to one embodiment of the present subject matter.

FIGS. 1-5 show one non-limiting embodiment of an apparatus for detecting airborne objects 100. In the embodiment shown in FIGS. 1-5, the airborne objects may comprise a threat complex 150. In the embodiment shown in FIGS. 1-5 the apparatus for detecting airborne objects 100 comprises a kill vehicle bus 110 having a radar sensor 120. The radar sensor 120 is an interferometric sensor comprising a plurality 130 of transmit-receive arrays 132. In some embodiments, one, more than one, or each and every one of the transmit-receive arrays 132 is adapted to be stowed in a stowed position 132a in or on the kill vehicle bus 110 as shown in FIG. 2. In some embodiments, one, more than one, or each and every one of the transmit-receive arrays 132 is adapted to be expandable from the stowed position 132a to an operable position 132b as shown in FIG. 3. Without limitation, in some embodiments an interferometric sensor may comprise two, three, four, or more transmit-receive arrays 132.

The radar sensor 120 may optionally comprise a dual-band sensor adapted to generate a first data set by operation in a semi-active mode at X-Band, and subsequently, an active mode at Ka- or W-band. The operation in semi-active mode at X-Band may be one embodiment of the above-described passive semi-active radar 144. The operation in active mode at Ka- or W-band may be one embodiment of the above-described active-mode radar 146. The first data set generated by operation in a semi-active mode at X-Band and subsequently an active mode at Ka- or W-band may be one embodiment of the above-described semi-active radar measurements 164 and the above-described active-mode radar measurement 166.

The kill vehicle bus may optionally comprise an EO/IR sensor co-aligned with the radar sensor 120 and adapted to operate to generate a second data set. This co-aligned EO/IR sensor, may be an EO sensor, or an IR sensor, or a sensor having both EO and IR sensors. The co-aligned EO/IR sensor may be one embodiment of the above-described multi-color IR sensor 148.

An apparatus for detecting airborne objects 100 may optionally comprise a data fusion device adapted to improve the discrimination abilities of the kill vehicle bus 110 by fusing at least part of the first data set and at least part of the second data set. Without limitation, a data fusion device may comprise a digital computer.

An apparatus for detecting airborne objects 100 may optionally comprise a processor adapted to digitize at least part of the first data set generated by operation in active-mode, as per one non-limiting embodiment of the above-described active-mode radar 146; and to process the digitized radar signal data in the frequency domain.

In some embodiments the kill vehicle bus 110 may comprises an EKV 112, or a mini kill vehicle ("MKV") 114, or both.

As noted above, in some embodiments, one, more than one, or each and every one of the transmit-receive arrays 132 is adapted to be stowed in a stowed position 132a in or on the kill vehicle bus 110 and in some embodiments, one, more than one, or each and every one of the transmit-receive arrays 132 is adapted to be expandable from the stowed position 132a to an operable position 132b. It may be desirable in certain embodiments for transmit-receive arrays 132 to be stowed in a stowed position during periods of flight or other transport in regions of denser atmospheric composition. The force acting on the transmit-receive arrays 132 is a function, in part, of the atmospheric density and the surface area of the transmit-receive arrays 132 presented normal to the path of flight or other transport. Should this force be sufficiently great, the transmit-receive arrays 132 or components operationally engaged with the transmit-receive arrays 132 could be damaged sufficiently to prevent operation. Forces large enough to cause such damage may be an issue during flight or other transport through regions of denser atmospheric composition. Stowing in a stowed position allows the transmit-receive arrays 132 to be transported in a manner which reduces or minimizes the surface area of the transmit-receive arrays 132 presented normal to the path of flight or other transport and thereby reduces or minimizes the force acting on the transmit-receive arrays 132 sufficiently that they may be transported without substantial harm to the transmit-receive arrays 132. When the kill vehicle bus 110 reaches a region of sufficiently low density atmospheric composition, such as may be the case proximate to apogee of a ballistic missile or other ballistically deployed threat complex 150, the atmospheric density may be small enough that the force acting on the transmit-receive arrays 132 may be sufficiently small to prevent damage to the transmit-receive arrays 132 even when they are deployed to present a large surface area normal to the path of flight or other transport. In such situations, it may be desirable to expand or otherwise deploy one or more transmit-receive arrays 132 from the stowed position 132a to an operable position 132b. When a transmit-receive array 132 is in an operable position 132b it presents a large surface area which is desirable to sensor reception and functionally such as the passive semi-active radar 144, the active-mode radar 146, and the multi-color IR sensor 148. Accordingly, the transmit-receive arrays 132 being adapted to be stowed in a stowed position 132a in or on the kill vehicle bus 110 and being adapted to be expandable from the stowed position 132a to an operable position 132b permits the flight or transport of transmit-receive arrays 132 with a substantial surface area while mitigating the risk of harm to the transmit-receive arrays 132 from air and atmospheric forces during deployment.

Expansion of a transmit-receive array 132 from the stowed position 132a to an operable position 132b may be accomplished by operation engagement of a linkage, a servo motor, a stepper motor, and encoder, a hydraulic actuator, or other actuation or sensing elements chosen with good engineering judgment.

Figure 5:
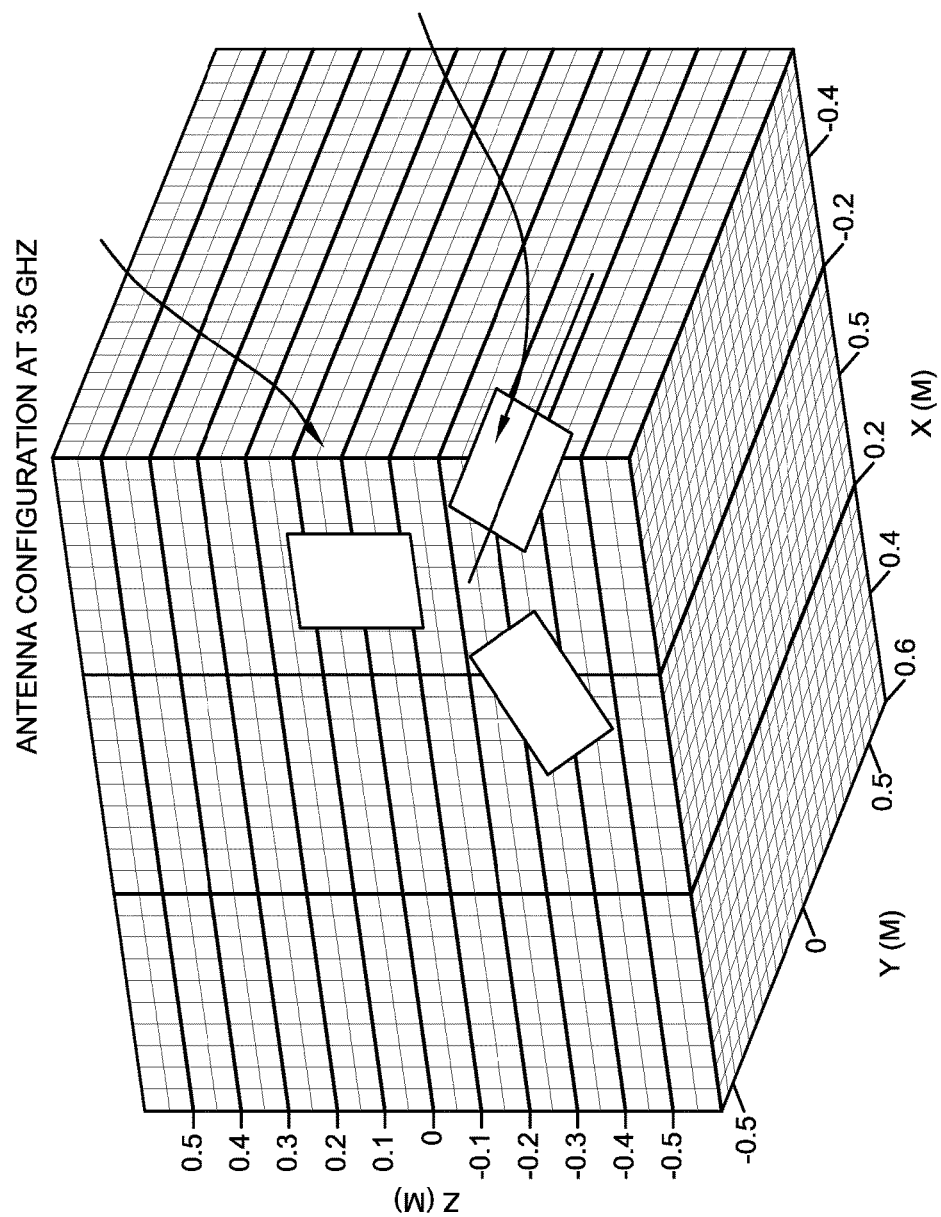
FIG. 5 is a spatial diagram of a 35 GHz antenna configuration in an operational position according to one embodiment of the present subject matter.

FIG. 6 shows one non-limiting embodiment of an antenna configuration 170 in an operable position. Without limitation, the antenna shown in FIG. 5 is a 35 GHz antenna comprising three transmit-receive arrays 132.

Further examples consistent with the present subject matter are set out in the following numbered clauses.

Clause 1. An apparatus for detecting airborne objects comprising a kill vehicle bus having a radar sensor, wherein the radar sensor is an interferometric sensor comprising a plurality of transmit-receive arrays, and wherein each of the transmit-receive arrays is adapted to be stowed in a stowed position in or on the kill vehicle bus and is adapted to be expandable from the stowed position to an operable position.

Clause 2. The apparatus for detecting airborne objects of clause 1, wherein the radar sensor is a dual-band sensor adapted to generate a first data set by operation in a semi-active mode at X-Band, and subsequently, an active mode at Ka- or W-band.

Clause 3. The apparatus for detecting airborne objects of clauses 1 or 2, wherein the kill vehicle bus further comprises a co-aligned sensor that is an EO sensor or an IR sensor, the co-aligned sensor being co-aligned with the radar sensor and adapted to operate to generate a second data set.

Clause 4. The apparatus for detecting airborne objects of clauses 1-3, wherein at least part of the first data set and at least part of the second data set are fused.

Clause 5. The apparatus for detecting airborne objects of clauses 1-4, wherein the first data set generated by operation in active-mode is digitized.

Clause 6. The apparatus for detecting airborne objects of clauses 1-5, wherein the digitized first data set is processed in the frequency domain.

Clause 7. The apparatus for detecting airborne objects of clauses 3-6, wherein the co-aligned sensor is an IR sensor.

Clause 8. The apparatus for detecting airborne objects of clauses 1-7, wherein the kill vehicle bus comprises an EKV or a MKV.

Clause 9. The apparatus for detecting airborne objects of clauses 1-8, wherein the interferometric sensor comprises three transmit-receive arrays.

Clause 10. An apparatus for detecting airborne objects comprising a kill vehicle bus having a radar sensor, wherein the radar sensor is a dual-band sensor adapted to generate a first data set by operation in a semi-active mode at X-Band, and subsequently, an active mode at Ka- or W-band, is an interferometric sensor comprising a plurality of transmit-receive arrays, and wherein the plurality of transmit-receive arrays are adapted to be stowed in a stowed position in or on the kill vehicle bus and are adapted to be expandable from the stowed position to an operable position; a co aligned sensor that is an IR sensor, the co-aligned sensor being co-aligned with the radar sensor and adapted to operate to generate a second data set; wherein, at least part of the first data set and at least part of the second data set are fused, the first data set generated by operation in active mode is digitized, and the digitized first data set is processed in the frequency domain; wherein the kill vehicle bus comprises an EKV or a MKV; and wherein the interferometric sensor has three transmit-receive arrays.

Clause 11. A method for detecting airborne objects comprising providing a kill vehicle bus having a radar sensor, wherein the radar sensor is an interferometric sensor comprising a plurality of transmit-receive arrays, and wherein each of the transmit-receive arrays is adapted to be stowed in a stowed position in or on the kill vehicle bus and is adapted to be expandable from the stowed position to an operable position; expanding at least one of the transmit-receive arrays from the stowed position to an operable position; and receiving a radar signal with at least one of the transmit-receive arrays.

Clause 12. The method for detecting airborne objects of clause 11, wherein the radar sensor is a dual-band sensor; and wherein the method further comprises generating a first data set by operation in a semi-active mode at X-Band, and subsequently, an active mode at Ka- or W-band.

Clause 13. The method for detecting airborne objects of clauses 11 or 12, wherein the kill vehicle bus further comprises a co-aligned sensor that is either an EO sensor or an IR sensor, the co-aligned sensor being co-aligned with the radar sensor; and wherein the method further comprises generating a second data set by operating the co-aligned sensor.

Clause 14. The method for detecting airborne objects of clauses 11-13, wherein at least part of the first data set and at least part of the second data set are fused.

Clause 15. The method for detecting airborne objects of clauses 11-14, wherein the first data set generated by operation in active-mode is digitized.

Clause 16. The method for detecting airborne objects of clauses 11-15, wherein the digitized first data set is processed in the frequency domain.

Clause 17. The method for detecting airborne objects of clauses 11-16, wherein the co-aligned sensor is an IR sensor.

Clause 18. The method for detecting airborne objects of clauses 11-17, wherein the kill vehicle bus comprises an EKV or a MKV.

Clause 19. The method for detecting airborne objects of clauses 11-18, wherein the interferometric sensor comprises three transmit-receive arrays.

Numerous examples have been described, hereinabove. It will be apparent to those skilled in the art that the above methods and apparatuses may incorporate changes and modifications without departing from the general scope of the present teachings. It is intended to include all such modifications and alterations in so far as they come within the scope of the appended claims or the equivalents thereof.

What is claimed is:

1. An apparatus for detecting airborne objects comprising:
a kill vehicle bus having a radar sensor,
wherein the radar sensor comprises a plurality of transmit-receive arrays adapted to perform as an interferometric sensor, and
wherein each of the transmit-receive arrays is adapted to be stowed in a stowed position in or on the kill vehicle bus and is adapted to be expandable from the stowed position to an operable position.

2. The apparatus for detecting airborne objects of claim 1, wherein the radar sensor is a dual-band sensor adapted to generate a first data set by operation in a semi-active mode at X-Band, and subsequently, an active mode at Ka- or W-band.

3. The apparatus for detecting airborne objects of claim 2, wherein the kill vehicle bus further comprises a co-aligned sensor that is an EO sensor or an IR sensor, the co-aligned sensor being co-aligned with the radar sensor and adapted to operate to generate a second data set.

4. The apparatus for detecting airborne objects of claim 3, wherein at least part of the first data set and at least part of the second data set are fused.

5. The apparatus for detecting airborne objects of claim 4, wherein the first data set generated by operation in active-mode is digitized.

6. The apparatus for detecting airborne objects of claim 5, wherein the digitized first data set is processed in the frequency domain.

7. The apparatus for detecting airborne objects of claim 6, wherein the co-aligned sensor is an IR sensor.

8. The apparatus for detecting airborne objects of claim 7, wherein the kill vehicle bus comprises an EKV or a MKV.

9. The apparatus for detecting airborne objects of claim 8, wherein the interferometric sensor comprises three transmit-receive arrays.

10. An apparatus for detecting airborne objects comprising:
a kill vehicle bus having
a radar sensor, wherein the radar sensor
is a dual-band sensor adapted to generate a first data set by operation in
a semi-active mode at X-Band, and subsequently,
an active mode at Ka- or W-band,
comprises a plurality of transmit-receive arrays adapted to perform as an interferometric sensor, and
wherein the plurality of transmit-receive arrays are adapted to be stowed in a stowed position in or on the kill vehicle bus and are adapted to be expandable from the stowed position to an operable position;
a co-aligned sensor that is an IR sensor, the co-aligned sensor being co-aligned with the radar sensor and adapted to operate to generate a second data set;
wherein,
at least part of the first data set and at least part of the second data set are fused,
the first data set generated by operation in active-mode is digitized, and
the digitized first data set is processed in the frequency domain;
wherein the kill vehicle bus comprises an EKV or a MKV; and
wherein the interferometric sensor has three transmit-receive arrays.

11. A method for detecting airborne objects comprising:
providing a kill vehicle bus having a radar sensor,
wherein the radar sensor comprises a plurality of transmit-receive arrays adapted to perform as an interferometric sensor, and
wherein each of the transmit-receive arrays is adapted to be stowed in a stowed position in or on the kill vehicle bus and is adapted to be expandable from the stowed position to an operable position;

expanding at least one of the transmit-receive arrays from the stowed position to an operable position; and receiving a radar signal with at least one of the transmit-receive arrays.

12. The method for detecting airborne objects of claim 11, wherein the radar sensor is a dual-band sensor; and wherein the method further comprises generating a first data set by operation in a semi-active mode at X-Band, and subsequently, an active mode at Ka- or W-band.

13. The method for detecting airborne objects of claim 12, wherein the kill vehicle bus further comprises a co-aligned sensor that is either an EO sensor or an IR sensor, the co-aligned sensor being co-aligned with the radar sensor; and wherein the method further comprises generating a second data set by operating the co-aligned sensor.

14. The method for detecting airborne objects of claim 13, wherein at least part of the first data set and at least part of the second data set are fused.

15. The method for detecting airborne objects of claim 14, wherein the first data set generated by operation in active-mode is digitized.

16. The method for detecting airborne objects of claim 15, wherein the digitized first data set is processed in the frequency domain.

17. The method for detecting airborne objects of claim 16, wherein the co-aligned sensor is an IR sensor.

18. The method for detecting airborne objects of claim 17, wherein the kill vehicle bus comprises an EKV or a MKV.

19. The method for detecting airborne objects of claim 18, wherein the interferometric sensor comprises three transmit-receive arrays.

* * * * *